E. V. ANDERSON.
PRESSURE REGULATING VALVE.
APPLICATION FILED FEB. 1, 1911.
1,173,633.
Patented Feb. 29, 1916.
4 SHEETS—SHEET 1.
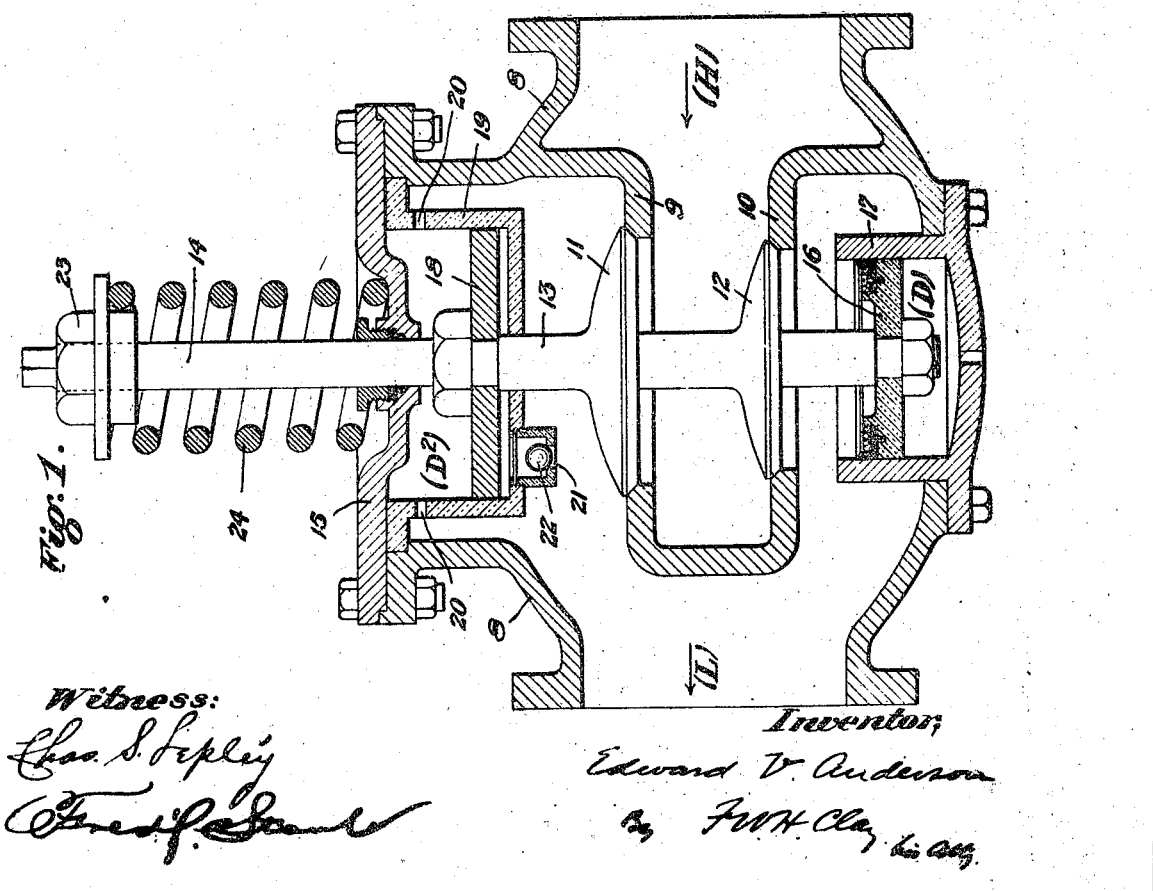

E. V. ANDERSON.
PRESSURE REGULATING VALVE.
APPLICATION FILED FEB. 1, 1911.
1,173,633.
Patented Feb. 29, 1916.
4 SHEETS—SHEET 2.
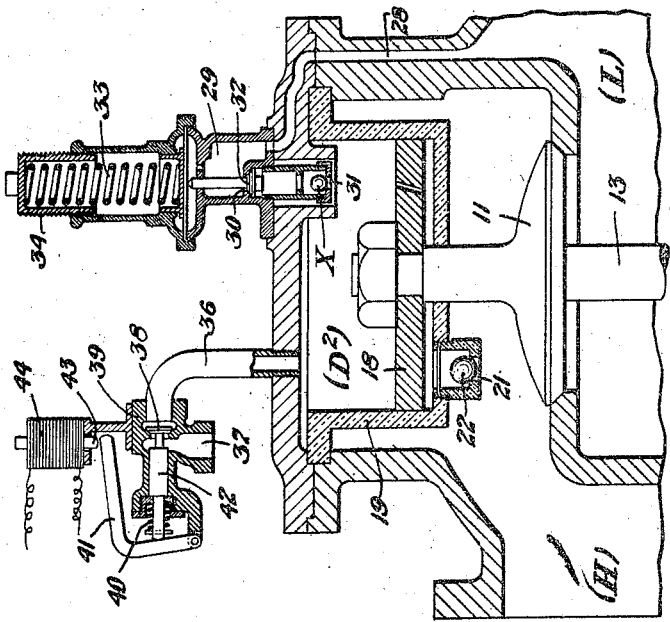
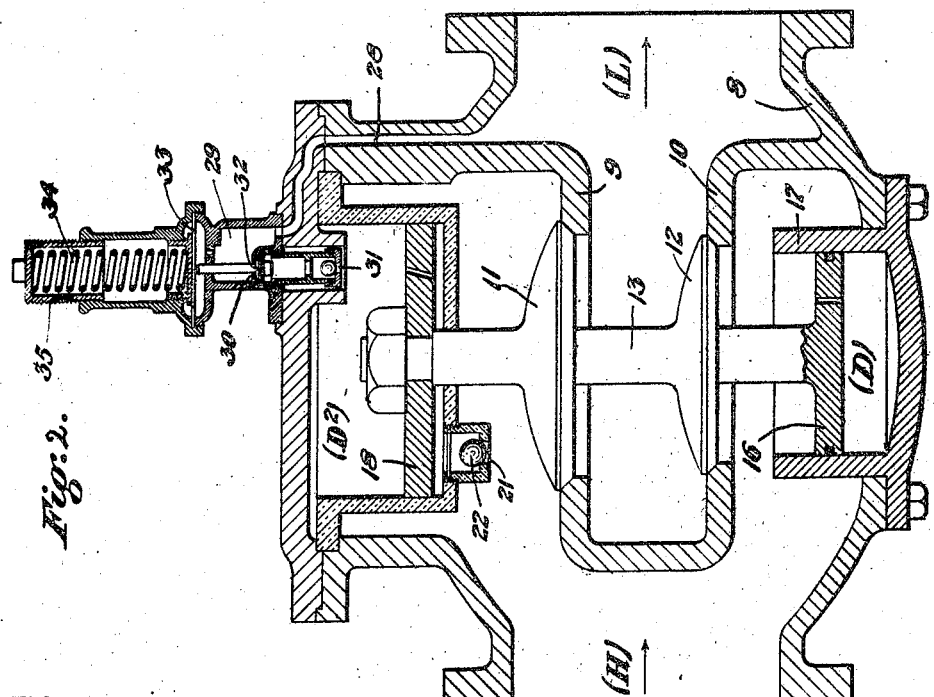

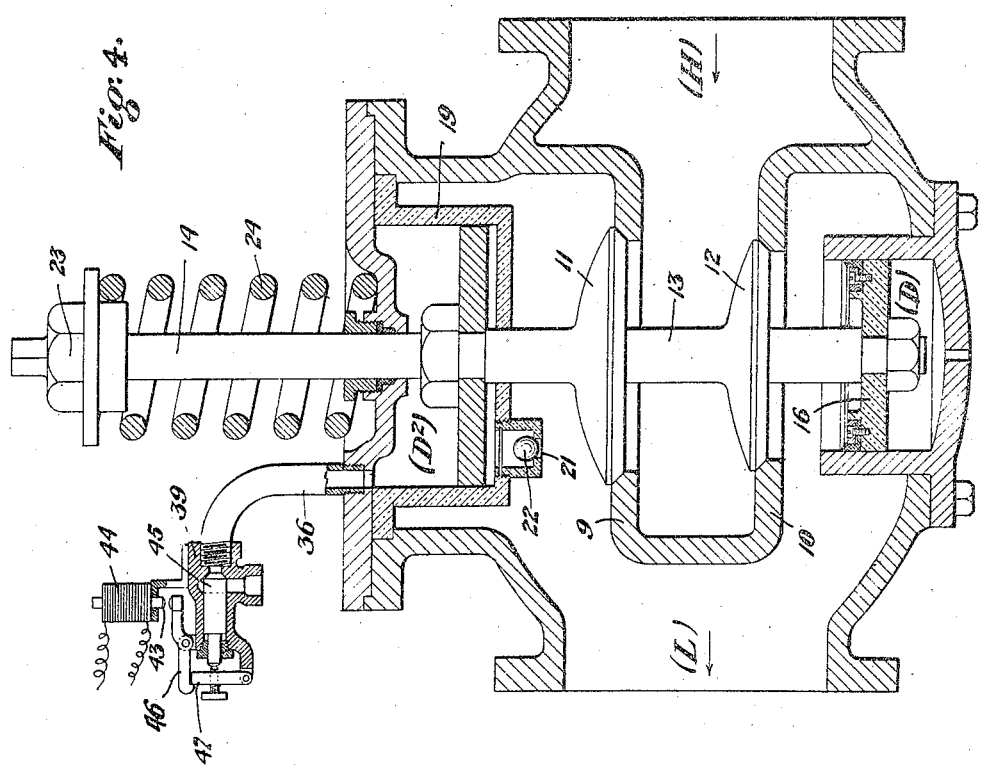

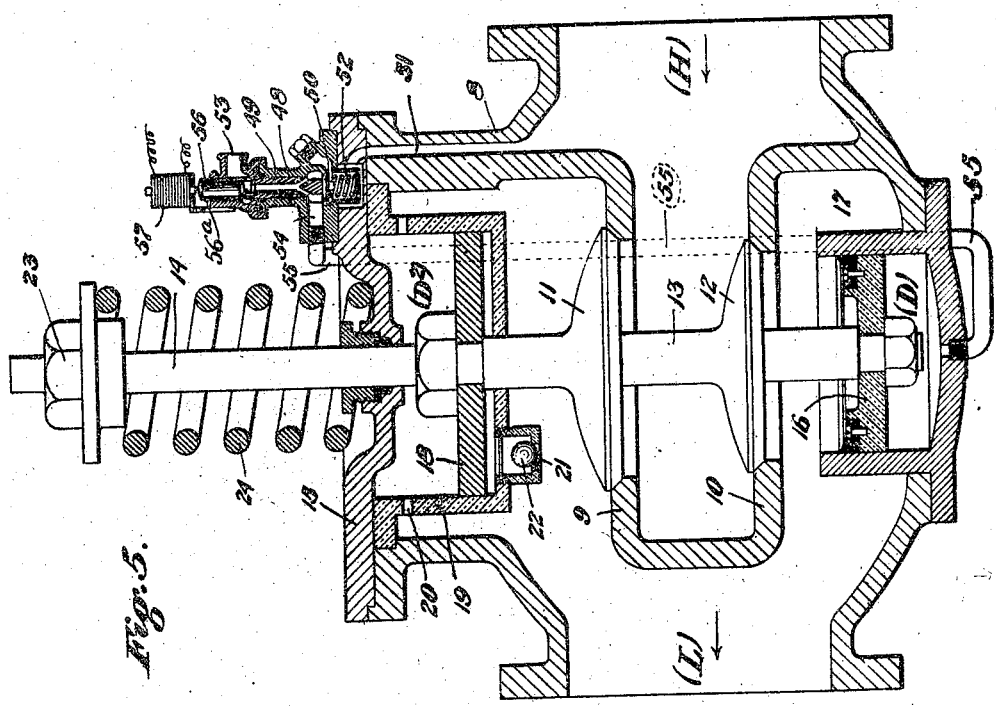

UNITED STATES PATENT OFFICE.

EDWARD V. ANDERSON, OF MONESSEN, PENNSYLVANIA, ASSIGNOR OF ONE-HALF TO CHARLES E. GOLDEN, OF CRAFTON, PENNSYLVANIA.

PRESSURE-REGULATING VALVE.

1,173,633.   Specification of Letters Patent.   Patented Feb. 29, 1916.

Application filed February 1, 1911. Serial No. 606,057.

*To all whom it may concern:*

Be it known that I, EDWARD V. ANDERSON, a citizen of the United States, residing at Monessen, in the State of Pennsylvania, have invented certain new and useful Improvements in Pressure-Regulating Valves, of which the following is a specification.

My invention relates to valves for reducing or regulating the pressure of fluids, and particularly to improving the adjusting means and means for handling the valve when desired, to open it to admit high pressures. In addition to this, my objects are to provide improving cushioning devices and balancing devices and generally to render the manipulation more certain and efficient. These objects and other advantages to hereinafter appear, I obtain by means of the construction and operation hereinafter described and shown in several forms in the accompanying drawings, wherein—

Figure 1 is a vertical section showing a pressure regulating valve with a spring adjustment. Fig. 2 is a vertical section of a valve of the same general type with a different form of adjusting means for regulating the pressure, and Fig. 3 is a partial section of the same valve with the addition of an electrically operated quick opening means. Fig. 4 is a vertical section of a double seated cushion pressure regulating valve similar to that of Fig. 1 and supplied with electrically operated means for quick opening in emergency. Fig. 5 is a vertical central section of a valve similar to that of Fig. 1 with the addition of a pilot valve electrically operated and designed to prevent the closure or necessity of readjusting the reducing means upon changing the line pressure in emergency, when desired.

In the drawings, I show a double seated valve designed to maintain a given fixed pressure on the low pressure side and having means to balance it and to cushion its movement in either direction. Thus in Fig. 1 the casing 8 has a double web partition 9, 10 with valve seats therein to receive the large valve 11 and the small valve 12 mounted upon the same stem 13, extending at 14 through the cap 15 of the casing 8. The same stem also extends downwardly and carries a piston 16 working in a dashpot 17, for the purpose of counterbalancing the upward pressure on the valve and the adjusting spring and preventing sudden movements or water hammer. On the upper side the stem 13 also carries a piston 18 which operates in the chamber $D^2$ having ports 20 opening to the low pressure or outlet side of the valve casing and also having a port 21 provided with a ball check 22. It will be plain that this construction allows the valve to open quickly but insures its closing gradually, the ports 20 and 21 being closed to the space under piston 18 so that the escapement from beneath it is by leakage around the piston; meantime piston 16 retarding movements equally in both directions.

The stem extension 14 of the main valve in Fig. 1 is provided with a regulating nut 23, holding down a spiral spring 24, by means of which the upward pull of the stem 13 may be set at any desired value to coöperate with the differential valves 11 and 12 and piston 16 to automatically maintain on the low pressure side at the left of the casing 8, a predetermined degree of pressure. The valves 11 and 12 may be the same size, as the opening is provided for by spring 24.

In the construction shown in Figs. 2 and 3 the pressure regulation is governed by an auxiliary valve. A passage 28 from the low pressure side of the casing 8, leads to a chamber 29 which in turn opens by way of port 30 and ports 31 and 28 to the low pressure side of the valve casing. The port 30 however, is governed by a stop valve on the stem 32, which is normally held down and open by the contact of its stem with the diaphragm 33 under regulable pressure of the spring 34 in the adjustable casing 35. When, however, the pressure rises too high at the point (L) in the main valve casing, this pressure acting upon the diaphragm 33 compresses the spring 34 and allows the small valve 32 to close, whereupon the now balanced pressure on the dashpot disk 18 will allow gradual closing of the main valve on account of the excess area of valve disk 11 until the low pressure side is again reduced to the normal and the pilot valve 32 is again opened to allow escape by way of the passage 28.

In Fig. 3 I have shown, added to the device of Fig. 2, an electrically operated means for accomplishing the function of permitting escape of pressure in the chamber ($D^2$) above the dash pot 18, thereby maintaining the valve open, even when the line pressure rises in the low pressure side of the main valve. The piston 18 in addition to its valve opening function, acts in this case, as also in the case of Fig. 2, to cushion the movement in both directions. In Fig. 2, the piston 16 in the dash pot 17, has also, in addition to its balancing function, an effect in cushioning the movement in both directions. This consists of a pipe 36 which has an escapement to the atmosphere by port 37 under a valve 38 in casing 39. The valve 38 however, is normally held to its seat by pressure in pipe 36 supplemented by spring 40, and is released by pressure of the lever 41, on its stem 42. The lever 41 is pushed downwardly by the movable core 43 of a solenoid 44 which is operated from any convenient distant point by the closing of the switch of the electrical circuit, as will be understood.

It has been explained that the action of the valve 32 maintains a certain fixed pressure on the low pressure side and of course in such case, if this pressure should rise the main valve 13 would throttle, as already explained. In some cases however, as when in a water line there is a fire and the full pressure from the pumps is desired to be used, it will be required that the valve remain open, even when the pressure rises all through the line; and it is the function of the electrically operated relief valve to bring about this condition. That is, it will be understood that when the electric circuit is closed by the switch, conveniently located near the pump or at some central station, the solenoid 44 will cause the valve 38 to open, thus relieving the pressure behind disk 18, in consequence of which the main valve 13 will remain open, notwithstanding the action of pilot valve 32. The ball check X will of course close and prevent back pressure flow into chamber D².

Fig. 4 shows another form of this electrically operated valve for counteracting the normal effect of the pressure regulating device on the main valve. In this case, I have shown the main valve having a spring pressure regulator as in Fig. 1, and the normal action of throttling the main valve 11, 12 when the pressure rises too high on the outlet side at (L) is obviated by opening a vent from the chamber (D²) to the atmosphere by a pipe 36 as last above described. But whereas the relief devices of Fig. 3 will immediately return to normal condition when the switch controlled solenoid 44 is shifted back to open the circuit, the present modification is arranged so that when the relief valve is once opened it remains open. That is, in this case, the valve 45 in the casing 39 is allowed to open under the pressure in chamber D² when by exciting the coil 44 the core 43 thereof presses down upon a lever 46 and releases the trigger 47 which normally engages the stem of valve 45. Of course, when this action has occurred, valve 45 remains permanently open until the trigger 47 is replaced by hand. Both the piston in chamber (D) and that in chamber (D²) cushion the movements of the main valve in both directions.

In Fig. 5 I have shown a pressure regulating valve as before, provided with a spring regulator on the stem extension 14 and have added thereto a means to more quickly and efficiently open and keep open the main valve when it is desired to use the full line pressure as in an emergency, and without waste of water.

In the top of the cap 15 of the valve casing 8 I have inserted a pilot and auxiliary valve casing 48 in which I mount a sliding stem 49. This stem has at its lower end a valve 50 normally closing a chamber connected by passage 51 to the high pressure side of the main valve casing 8. The valve 50 is held to its seat by this pressure and also by the spiral spring 52. The stem 49 is hollow and at the top communicates by a port 53 with the atmosphere, while at the lower end it communicates by passages 54 with a pipe 55 leading to the dashpot chamber (D) under the disk 16 of the main valve. This escape port 53 is normally held open by raising the small plug valve 56 by means of a very light spring 56ª; so that the chamber D is at atmospheric pressure in both movements of piston 16. Above this needle valve 56 is a solenoid 57 whose core is thrust down upon energizing the coil and this has the effect first of closing port 53 and afterward of pushing down the hollow stem 49 against the spring 52 so as to open the pilot valve 50. When this occurs, the high pressure from the main valve casing enters from the passage 51 and passes down through the pipe 55 to the under side of the disk 16 of the dashpot, thus holding up the main valve without regard to the pressure in the main valve casing. This enables the normal operation of the pressure regulating valve to be interrupted so that the full pressure of the line may be employed in case of fire and the like, and without re-adjusting the pressure regulating means. The pilot valve itself is claimed in my co-pending application No. 870,589, of Nov. 6, 1914.

In all the above forms of valve, it will be noted that I provide a balanced valve which may be accurately set to regulate the pressure on the low pressure side and which in any of its motions is fully cushioned to prevent water hammer. It may be opened quickly, but closes slowly. Also, I have set forth means for a more delicate regulation of the pressure by directly employing a relief valve. Also, I have provided means for suspending the normal operation of the regulating valve so that it can ↳ interfere with the use of full pressure in the mains, when occasion requires. Also, I have provided an electrically operated means to allow the valve to open under any pressure and to insure its remaining open. And finally, I have added to this a device by which the main valve is allowed to open quickly and absolutely by the direct action of the high pressure side, as in cases of emergency and this controlled by electrical means at any distance away and instantaneously, not depending upon any handling of the valve itself. This feature of controlling the valve, and especially of interrupting the normal operation of a pressure regulating valve from a distance and by electrical means, I regard as very important.

Having thus described my invention, and illustrated its use, what I claim as new is the following:

1. A pressure regulating valve comprising a casing, a valve therein, the valve stem carrying the piston of a dashpot, connections to balance the valve and dashpot under line pressure in an open condition, including a connection to the line pressure adapted to depress the piston and close the valve upon raising the line pressure, and a check valve in said dashpot whereby to allow the piston to rise more freely than it falls by entrapping fluid in falling, substantially as described.

2. A fluid pressure regulator comprising a valve casing having a valve seat and two cylinders formed therein, a reducing valve coöperating with said seat and having a stem, two pistons mounted on said stem and working in said cylinders to cushion the opening and closing movements of the valve, and means coöperating with one of said pistons to confine its cushioning effect to the closing movement of the valve.

3. A pressure regulating valve comprising a main valve having two seats of different size, a dashpot including a piston on the valve stem and provided with a check valve therein, means to regulate the throttling pressure, and means operated from without the valve to prevent the automatic throttling operation in emergency.

4. A pressure regulating valve having a retarding device to prevent sudden closing and means to interrupt the normal operation of said device including electrical devices operable from a distance, substantially as described.

5. A pressure regulating valve having a dash-pot to prevent sudden closing, an auxiliary piston to operate the valve by manipulating the pressure underneath the same, and an electrically operated pilot valve to introduce pressure from the high pressure side under said piston, substantially as described.

In testimony whereof I have hereunto signed my name in the presence of the two subscribed witnesses.

EDWARD V. ANDERSON.

Witnesses:
   FREDK. STOUT,
   CHAS. S. LEPLEY.